(12) United States Patent
Venkatesan et al.

(10) Patent No.: US 9,128,746 B2
(45) Date of Patent: Sep. 8, 2015

(54) ASYNCHRONOUS UNMAP OF THINLY PROVISIONED STORAGE FOR VIRTUAL MACHINES

(71) Applicant: VMware, Inc., Palo Alto, CA (US)

(72) Inventors: Dhanashankar Venkatesan, Palo Alto, CA (US); Prasanna Aithal, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 302 days.

(21) Appl. No.: 13/853,608

(22) Filed: Mar. 29, 2013

(65) Prior Publication Data

US 2014/0298326 A1 Oct. 2, 2014

(51) Int. Cl.
G06F 9/455 (2006.01)
G06F 3/06 (2006.01)
G06F 12/02 (2006.01)

(52) U.S. Cl.
CPC .......... *G06F 9/45558* (2013.01); *G06F 3/0608* (2013.01); *G06F 12/0246* (2013.01); *G06F 2009/45579* (2013.01)

(58) Field of Classification Search
None
See application file for complete search history.

(56) References Cited

U.S. PATENT DOCUMENTS

| 6,957,237 | B1 * | 10/2005 | Traversat et al. | 1/1 |
| 8,380,676 | B1 * | 2/2013 | Eastham et al. | 707/662 |
| 2003/0212873 | A1 * | 11/2003 | Lee et al. | 711/170 |
| 2005/0149571 | A1 * | 7/2005 | Jeon et al. | 707/104.1 |
| 2006/0069850 | A1 * | 3/2006 | Rudelic | 711/103 |
| 2007/0266128 | A1 * | 11/2007 | Bhogal et al. | 709/223 |
| 2010/0211737 | A1 * | 8/2010 | Flynn et al. | 711/114 |
| 2011/0179082 | A1 * | 7/2011 | Vaghani et al. | 707/781 |
| 2012/0054410 | A1 * | 3/2012 | Vaghani et al. | 711/6 |
| 2012/0054746 | A1 * | 3/2012 | Vaghani et al. | 718/1 |
| 2012/0059976 | A1 * | 3/2012 | Rosenband et al. | 711/103 |
| 2012/0059978 | A1 * | 3/2012 | Rosenband et al. | 711/103 |
| 2012/0079174 | A1 * | 3/2012 | Nellans et al. | 711/103 |
| 2012/0167080 | A1 * | 6/2012 | Vilayannur et al. | 718/1 |
| 2012/0233434 | A1 * | 9/2012 | Starks et al. | 711/170 |
| 2012/0246405 | A1 * | 9/2012 | Schroeder et al. | 711/118 |
| 2012/0265920 | A1 * | 10/2012 | Baron | 711/6 |
| 2012/0311291 | A1 * | 12/2012 | Fiske et al. | 711/170 |
| 2012/0331242 | A1 * | 12/2012 | Shaikh et al. | 711/154 |
| 2013/0036418 | A1 * | 2/2013 | Yadappanavar et al. | 718/1 |
| 2013/0060989 | A1 * | 3/2013 | Aune | 711/103 |
| 2013/0262532 | A1 * | 10/2013 | Wade et al. | 707/816 |
| 2013/0275660 | A1 * | 10/2013 | Bennett | 711/103 |
| 2013/0290608 | A1 * | 10/2013 | Nelogal et al. | 711/103 |
| 2013/0326186 | A1 * | 12/2013 | Shaikh et al. | 711/170 |
| 2013/0346724 | A1 * | 12/2013 | Ranade et al. | 711/173 |
| 2015/0121003 | A1 * | 4/2015 | Rosenband et al. | 711/114 |

* cited by examiner

Primary Examiner — Emerson Puente
Assistant Examiner — Benjamin Wu

(57) ABSTRACT

In a computer system having virtual machines running therein, a hypervisor that supports execution of the virtual machines allocates blocks of storage to the virtual machines from a thinly provisioned logical block device. When the hypervisor deletes a file or receives commands to delete a file, the hypervisor moves the file into a delete directory. An unmap thread running in the background issues unmap commands to the storage device to release one or more blocks of the logical block device that are allocated to the files in the delete directory, so that the unmap operation can be executed asynchronously with respect to the file delete event.

17 Claims, 5 Drawing Sheets

ASYNCHRONOUS UNMAP OF THINLY PROVISIONED STORAGE FOR VIRTUAL MACHINES

BACKGROUND

Computer virtualization is a technique that involves encapsulating a physical computing machine platform into a virtual machine that is executed under the control of virtualization software running on a hardware computing platform, or "host." A virtual machine has both virtual system hardware and guest operating system software. Virtual system hardware typically includes at least one "virtual disk," a single file or a set of files that appear as a typical storage drive to the guest operating system. The virtual disk may be stored on the host platform or on a remote storage device. Typically, a virtual machine (VM) uses the virtual disk in the same manner that a physical storage drive is used, to store the guest operating system, application programs, and application data.

The virtualization software, also referred to as a hypervisor, manages the guest operating system's access to the virtual disk and maps the virtual disk to the underlying physical storage resources that reside on the host platform or in a remote storage device, such as a storage area network (SAN) or network attached storage (NAS). Because multiple virtual machines can be instantiated on a single host, allocating physical storage space for virtual disks corresponding to every instantiated virtual machine in an organization's data center can stress the physical storage space capacity of the data center. For example, when provisioning a virtual disk for a virtual machine, the virtualization software may allocate all the physical disk space for the virtual disk at the time the virtual disk is initially created, sometimes creating a number of empty data blocks containing only zeros ("zero blocks"). However, such an allocation may result in storage inefficiencies because the physical storage space allocated for the virtual disk may not be timely used (or ever used) by the virtual machine. In one solution, known as "thin provisioning," the virtualization software dynamically allocates physical storage space to a virtual disk only when such physical storage space is actually needed by the virtual machine and not necessarily when the virtual disk is initially created.

In a similar manner, thin provisioning may be implemented as a storage space optimization technology in the underlying storage hardware, e.g., storage array, which may include an array of rotating disks or solid state disks as the physical storage media. In such cases, a storage system controller that manages the physical storage media and exposes them as logical data storage units, referred to as logical unit numbers (LUNs), to the host, thinly provisions the LUNs. That is, the storage system controller dynamically allocates physical storage space to the LUNs only when such physical storage space is actually needed by the LUNs and not necessarily when the LUNs are initially created. As a result, when the LUNs are initially created, the logical size of each of the LUNs is typically much greater than its physical size.

However, even with the use of thinly-provisioned virtual disks and thinly-provisioned LUNs, storage inefficiencies may be caused by an accumulation of "stale" data, i.e., disk blocks that were previously used and are currently unused but remain allocated. For example, deletion of a file, such as a temporary file or a swap file used by the hypervisor while supporting virtual machines, does not generally result in a release of the actual data blocks corresponding to the files. In addition, after migration of one or more virtual disks associated with a virtual machine, known as Storage vMotion™, is carried out, a set of files corresponding to the virtual disks is deleted by the hypervisor in response to an unlink command issued by a virtual machine management server. The deletion of these files does not necessarily result in a release of the actual data blocks corresponding to these files. This behavior can result in storage inefficiencies because such "stale" portions of the LUN are not utilized. U.S. patent application Ser. No. 13/181,153, filed Jul. 12, 2011, the entire contents of which are incorporated by reference herein, describes a technique that employs unmap commands to reclaim data blocks of "stale" data and continue to maintain the benefits of thin provisioning. However, the overhead associated with the execution of unmap operation in the storage system often offsets the benefits gained by the unmap operation.

SUMMARY

One or more embodiments provide asynchronous techniques for releasing free storage blocks previously allocated to a logical block device to an underlying storage device supporting the logical block device. In one embodiment, the logical block device is a LUN and blocks of the LUN are allocated to virtual machines by a hypervisor supporting execution of the virtual machines. When the hypervisor deletes a file or receives commands to delete a file associated with virtual disks, the hypervisor moves each such file into a delete directory instead of synchronously issuing an unmap command to the underlying storage device at that time. An unmap thread running in the background issues unmap commands to the storage device to release one or more blocks of the logical block device that are allocated to the files in the delete directory. As a result, the unmap commands are issued to the storage device asynchronously with respect to the file delete commands.

A method of issuing commands to release storage allocated to a logical block device by a storage device, according to an embodiment, includes the steps of: upon deleting a file or receiving a command to delete a file, moving the file into a delete directory; and cycling through one or more files in the delete directory and, for each file, issuing an unmap command to release one or more blocks of the logical block device that are allocated thereto according to a length of time the file has been placed in the delete directory or some other criteria, including file size, file type, and file contents.

Further embodiments include, without limitation, a non-transitory computer-readable storage medium that includes instructions that enable a computer system to implement one or more aspects of the above methods as well as a computer system configured to implement one or more aspects of the above methods.

DETAILED DESCRIPTION

Figure 1:
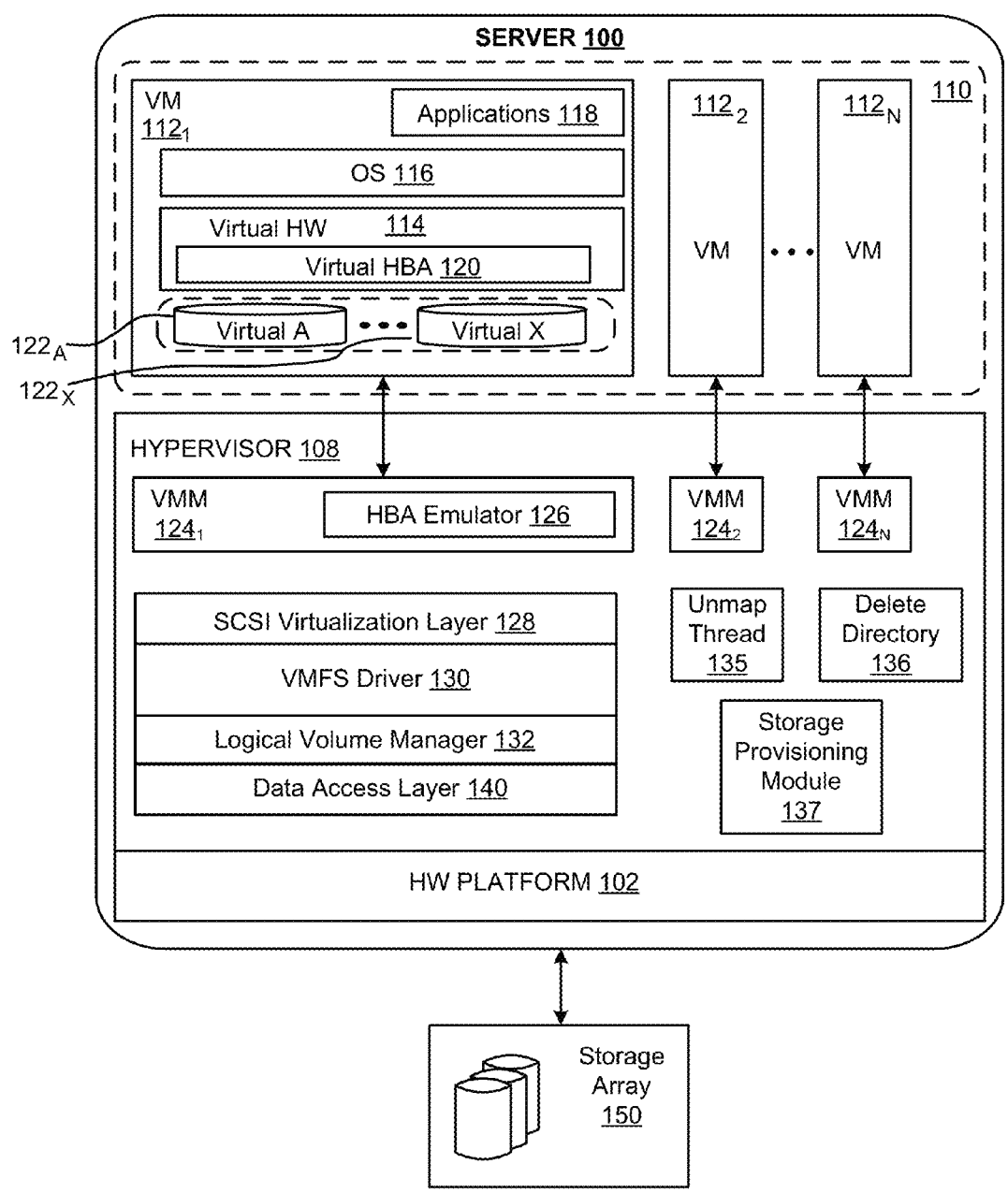
FIG. 1 is a block diagram that shows a virtualized computer architecture in which embodiments may be implemented.

FIG. 1 depicts a block diagram of a server 100 that is representative of a virtualized computer architecture in which embodiments may be implemented. As illustrated, server 100 is hosting multiple virtual machines that are running on and sharing a common physical hardware platform 102. Hardware platform 102 is comprised of, but not limited to, conventional, though typically server-class, computer hardware components, such as one or more central processing units, random access memory, various types of input/output devices, and persistent storage. As further illustrated, hypervisor 108 is installed on top of hardware platform 102. Hypervisor 108 is a virtualization software component that makes possible the concurrent instantiation and execution of one or more virtual machines (VMs) $112_1\text{-}112_N$ within virtual machine execution space 110.

After it is instantiated, each VM $112_1\text{-}1121_N$ encapsulates a physical computing machine platform that is executed under the control of the hypervisor 108. Each VM $112_1\text{-}112_N$ implements a virtual hardware platform 114 that supports the installation of a guest operating system (OS) 116 which is capable of executing applications 118. Examples of a guest OS 116 include any of the well-known commodity operating systems, such as Microsoft Windows, Linux, and the like. In each instance, guest OS 116 includes a native file system layer (not shown in FIG. 1), for example, an NTFS or an ext3FS type file system. These virtual file system layers interface with their respective virtual hardware platforms 114 to access, from the perspective of guest operating systems 116, a data storage host bus adapter (HBA). This HBA is, in reality, a virtual HBA 120 implemented by virtual hardware platform 114 that provides the appearance of disk storage support (virtual disks $122_A\text{-}122_X$) to guest OS 116, allowing guest OS 116 to execute seamlessly with the virtualized system hardware. In certain embodiments, virtual disks $122_A\text{-}122_X$ may appear to support, from the perspective of guest OS 116, the SCSI standard for connecting to the virtual machine or any other appropriate hardware connection interface standard known to those with ordinary skill in the art, including IDE, ATA, and ATAPI.

Although, from the perspective of guest operating systems 116, file system calls initiated by such guest operating systems 116 to implement file system-related data transfer and control operations appear to be routed to virtual disks $122_A\text{-}122_X$ for final execution, in reality, such calls are processed and passed through virtual HBA 120 to adjunct virtual machine monitor (VMM) layers $124_1\text{-}124_N$ that implement the virtual system support needed to coordinate operation with hypervisor 108. In particular, HBA emulator 126 functionally enables the data transfer and control operations to be correctly handled by hypervisor 108 which ultimately passes such operations through its various layers to physical HBAs that connect to a storage array 150, which may be a disk array, an SSD (solid state drive) array, or any mass storage device. Assuming a SCSI supported virtual device implementation (although those with ordinary skill in the art will recognize the option of using other hardware interface standards), SCSI virtualization layer 128 of hypervisor 108 receives a data transfer and control operation (in the form of SCSI commands, for example, intended for a SCSI-compliant virtual disk) from VMM layers $124_1\text{-}124_N$, and converts them into file system operations that are understood by virtual machine file system (VMFS) driver 130 in order to access a file stored in one of the LUNs in storage array 150 under the management of VMFS driver 130 that represents the SCSI-compliant virtual disk. In one embodiment, the file representing the virtual disk conforms to the VMware Virtual Disk (.vmdk) file format promulgated by VMware, Inc. for virtual disks, although it should be recognized that alternative virtual disk file formats may be used in other embodiments.

SCSI virtualization layer 128 then issues these file system operations to VMFS driver 130. VMFS 130, in general, manages creation, use, and deletion of files (e.g., such as .vmdk files representing virtual disks) stored on LUNs exposed by storage array 150. One example of a clustered file system that can serve as VMFS driver 130 in an embodiment is described in U.S. Pat. No. 7,849,098, entitled "Multiple Concurrent Access to a File System," filed Feb. 4, 2004 and issued on Dec. 7, 2010, the entire contents of which are incorporated by reference herein. VMFS driver 130, converts the file system operations received from SCSI virtualization layer 128 to volume (e.g. LUN) block operations, and provides the volume block operations to logical volume manager 132. Logical volume manager (LVM) 132 is typically implemented as an intermediate layer between the driver and file system layers, and supports volume oriented virtualization and management of the LUNs accessible through the physical HBAs. LVM 132 issues raw SCSI operations to device access layer 134 based on the LUN block operations. Data access layer 140 includes device access layer, which discovers storage array 150, and applies command queuing and scheduling policies to the raw SCSI operations, and device driver 136, which understands the input/output interface of the physical HBAs interfacing with storage array 150, and sends the raw SCSI operations from the device access layer to the physical HBAs to be forwarded to storage array 150.

It should be recognized that the various terms, layers and categorizations used to describe the virtualization components in FIG. 1 may be referred to differently without departing from their functionality or the spirit or scope of the invention. For example, VMMs 124 may be considered separate virtualization components between VMs 112 and hypervisor 108 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 114 may be merged with and into VMM 124 such that virtual host bus adapter 120 is removed from FIG. 1 (i.e., since its functionality is effectuated by host bus adapter emulator 126).

In the embodiments illustrated herein, virtual disks for VM $112_1\text{-}112_N$ are thinly provisioned and one or more LUNs in which the virtual disks are stored are also thinly provisioned. As a result, storage is allocated virtual disks of VM $112_1\text{-}112_N$ only as required by the virtual disks and storage is allocated to the LUNs only as required by the LUNs. When less storage is needed by the virtual disks, the corresponding VM 112 issues an unmap command to hypervisor 108 that is managing the virtual disks. Similarly, when less storage is needed by the LUNs, hypervisor 108 issues an unmap command to storage array 150.

According to embodiments, when hypervisor deletes a file or receives a command to delete a file, the file is moved into a delete directory 136 and an unmap thread 135 within hypervisor 108 executes in the background, preferably during periods when resource usage of server 100 is low, to examine time stamps of files that have been placed in delete directory 136 and issue unmap commands for blocks allocated to files that have been placed in delete directory 136 for longer than a threshold amount of time. As an alternative to length of time in delete directory 136, the file selection factors include file size, file type, and file contents. In one embodiment, temp files are selected before any other type of files. In another embodiment, files corresponding to virtual disks that have been migrated to a different LUN are selected before any other type of files.

Figure 2:
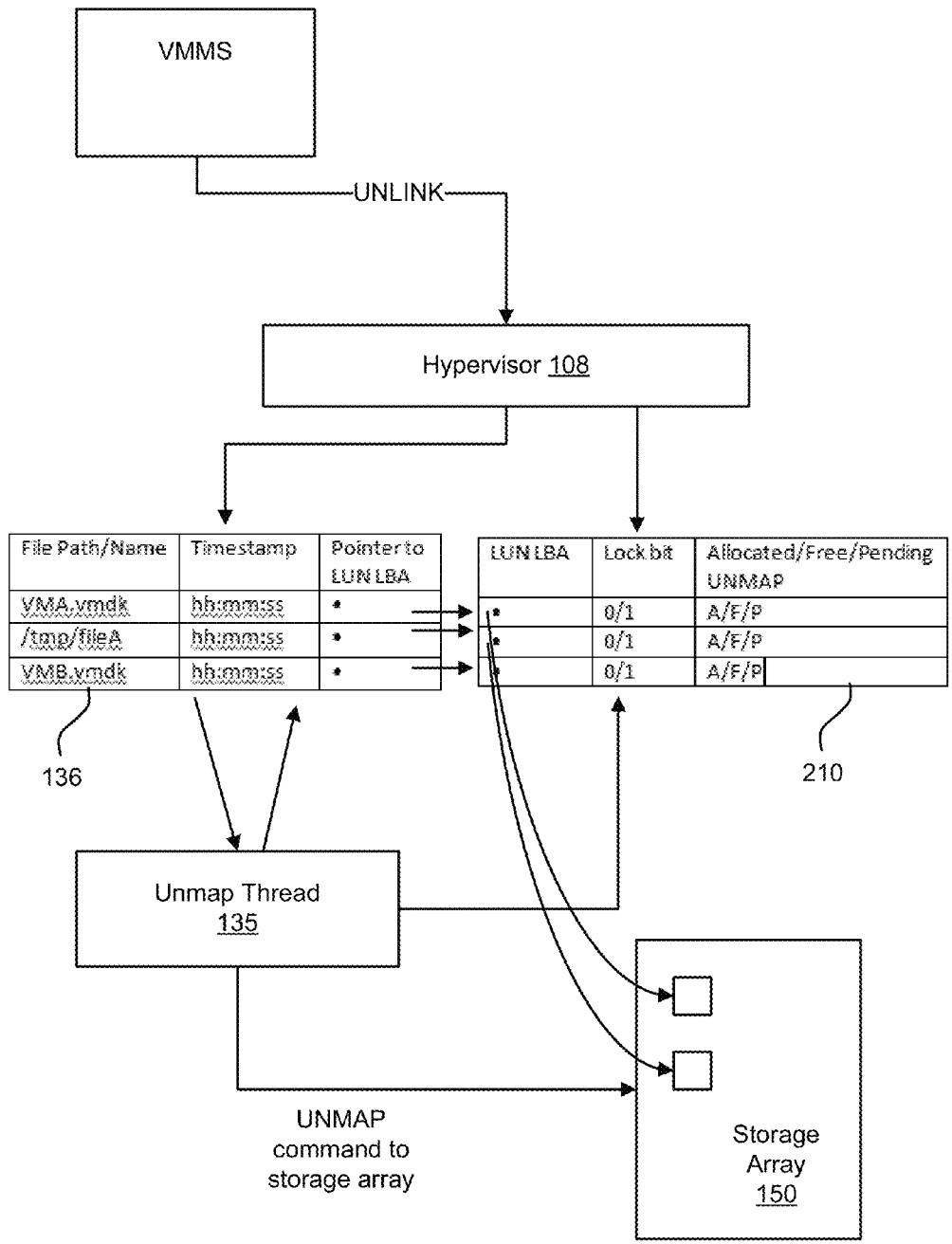
FIG. 2 is a conceptual diagram that illustrates an unmap process according to embodiments.

FIG. 2 is a conceptual diagram that illustrates an unmap process according to embodiments. In the example illustrated in FIG. 2, a virtual machine management server (VMMS) issues an unlink command for virtual disks that have been migrated to a different LUN, in response to which hypervisor 108 moves the file corresponding to the migrated virtual disks into delete directory 136. In addition, hypervisor 108 records a time stamp indicating when each such file has been moved into delete directory 136 in the directory's descriptor file (e.g., inode). In addition to delete directory 136, a block map 210 is maintained by hypervisor 108 to track which blocks of LUNs are tracked as currently allocated, free, or pending unmap. Block map 210 may also maintain a lock bit for each block to prevent competing entities (e.g., storage provisioning module 137 within hypervisor 108 and unmap thread 135) from updating the status of the same block at the same time. When a file is added to delete directory 136, blocks corresponding to the added file, which can be determined from the file's corresponding descriptor file (e.g., inode), are indicated in block map 210 as free. Because they are free, storage provisioning module 137 may allocate them for other uses. The files in delete directory 136 may also include temp files, swap files, and other files that hypervisor 108 has created and then subsequently deleted.

In an alternative embodiment, the information of block map 210 is provided by a free block bitmap and a set of inodes corresponding to the files in delete directory 136. The file blocks referenced by these inodes are understood to be "free" but "not yet unmapped." In this embodiment, the total storage space available would be reported as the sum of the number of unmapped blocks and the number of blocks of files in delete directory 136.

Figure 3:
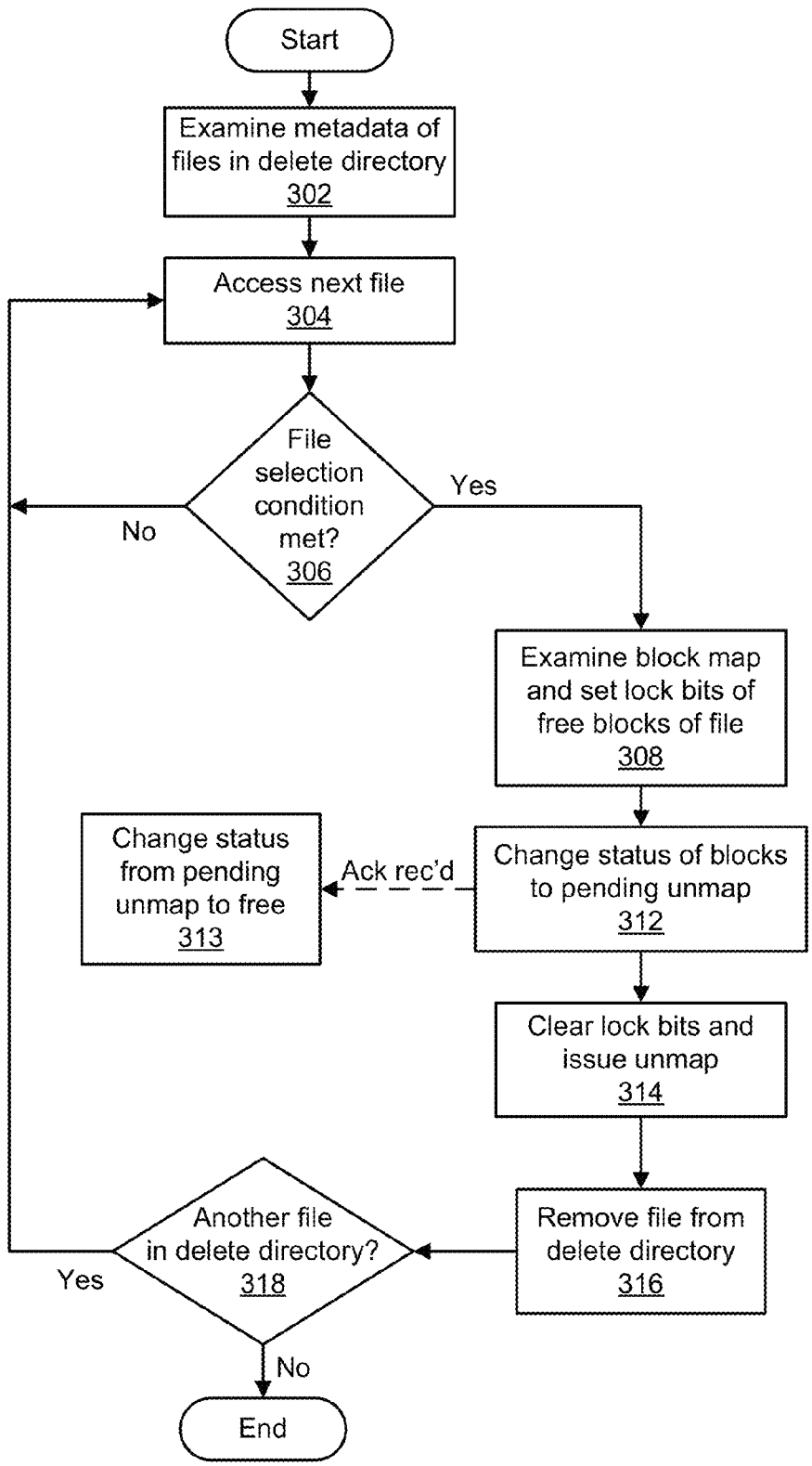
FIG. 3 is a flow diagram that illustrates the steps carried out by a background thread when issuing unmap commands to a storage device.

FIG. 3 is a flow diagram that illustrates the steps carried out by a background thread, e.g., unmap thread 135, when issuing unmap commands to a storage device. The background thread may be configured to execute periodically or opportunistically during periods of low resource usage by server 100. At step 302, the background thread retrieves the descriptor file for delete directory 136 and examine the metadata of files in delete directory 136, in particular locations of their descriptor files and time stamp of when they were placed in delete directory 136 (or other selection factor). The first or next file is accessed at step 304 and the file's time stamp (or other selection factor) examined at step 306. If the background thread determines that the file's time in delete directory 136 exceeds a threshold (or some other selection condition based on file size, file type, or file contents, is met), step 308 is executed. Otherwise, the process flow returns to step 304 where another file in delete directory 136 is accessed.

At step 308, the background thread examines block map 210 to see if any of the storage blocks of the file selected at step 304, as determined from its descriptor file, are free. It should be noted the storage block of the file may have been repurposed by hypervisor 108 (e.g., allocated for another purpose) since the file was placed in delete directory 136. If any storage blocks remain free, the background thread sets the lock bits associated with them in block map 210. Then, at step 312, the background thread further updates block map 210 to indicate these blocks as pending unmap. When an acknowledgement of unmap is received from the storage array, the background thread at step 313 changes the status of those blocks indicated as pending unmap at step 312 to free. Then, the background thread at step 314 clears the lock bits that were set at step 308 and at step 316 removes the processed file from delete directory 136. If there is another file in delete directory 136 to be processed, as determined at decision block 318, the process flow returns to step 304 where another file in delete directory 136 is accessed. Otherwise, the process terminates.

Figure 4:
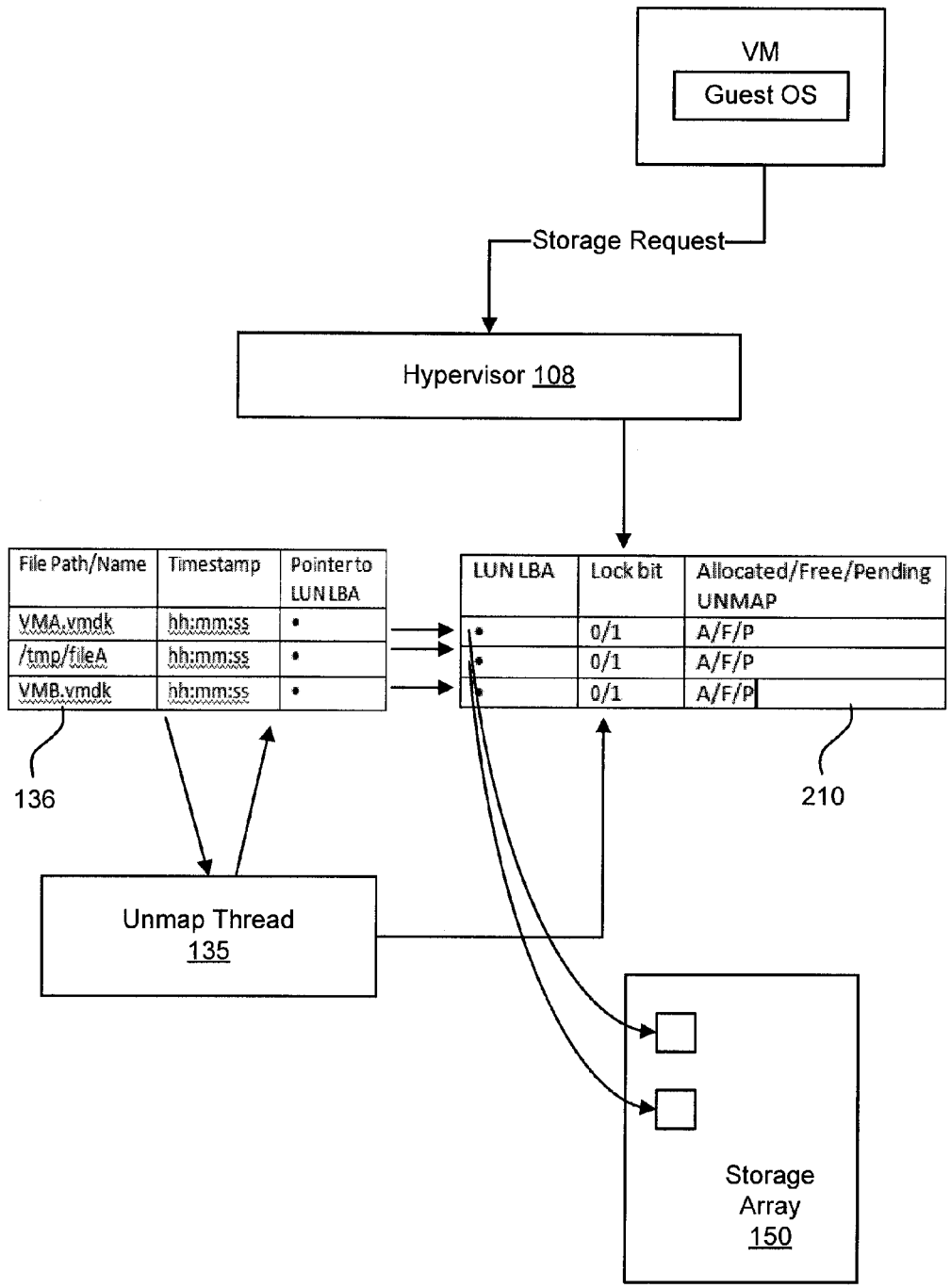
FIG. 4 is a conceptual diagram that illustrates a storage provisioning process according to embodiments.
Figure 5:
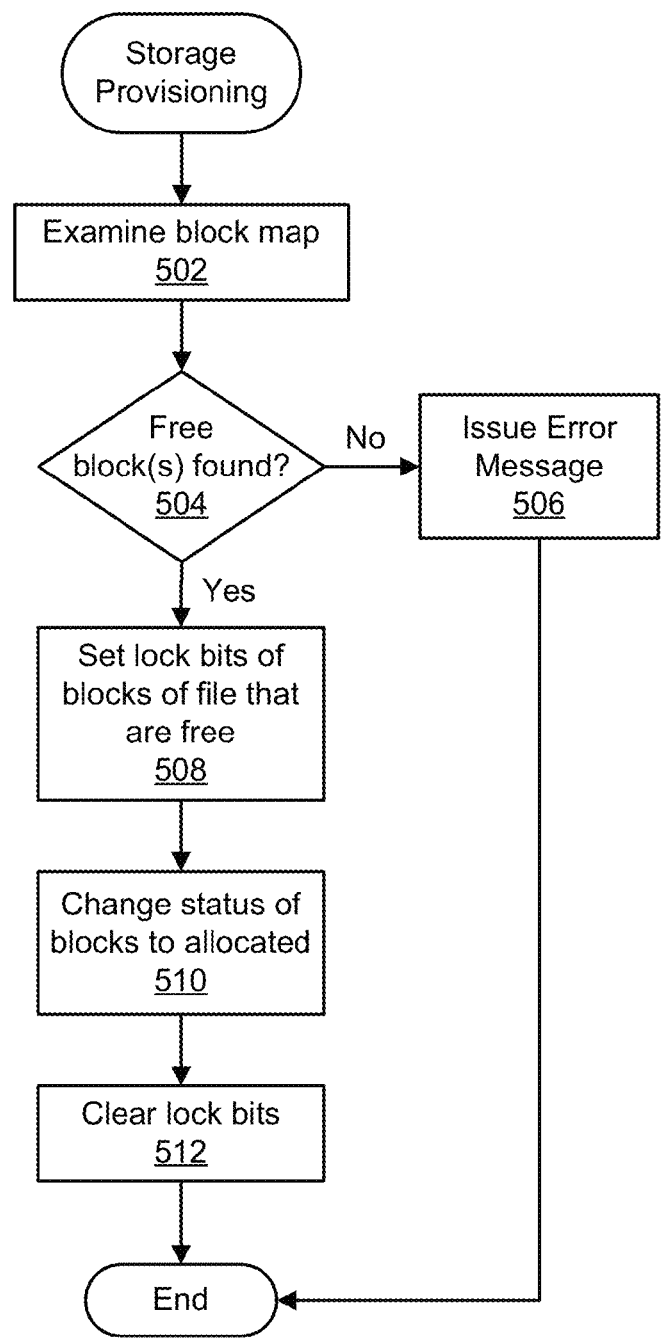
FIG. 5 is a flow diagram that illustrates the steps carried out by a storage provisioning module of a hypervisor when provisioning new storage to a virtual machine.

It was noted above that it is possible for storage blocks of files in delete directory 136 to have been repurposed by hypervisor 108 (e.g., allocated for another purpose). FIG. 4 is a conceptual diagram that illustrates a storage provisioning process according to embodiments. When a request for additional storage is made by a virtual machine (e.g., VM in FIG. 4), storage provisioning module 137 within hypervisor 108 searches block map 210 for sufficient number of free storage blocks to meet the request. In the alternative embodiment, hypervisor 108 searches the free block bitmap and the inodes of files in delete directory 136. FIG. 5 is a flow diagram that illustrates the steps carried out by the storage provisioning module in response to such a request.

The process begins at step 502 where the storage provisioning module examines block map 210 (or free block bitmap and the inodes of files in delete directory 136) for free blocks. It should be noted that the storage blocks that are pending unmap will not be counted as being free. If a sufficient number of free blocks are not found, as determined at decision block 504, the storage provisioning module returns an error message at step 506. On the other hand, if a sufficient number of free blocks are not found, step 508 is executed. At step 508, the storage provisioning module sets the lock bits associated with the free blocks that were found in block map 210. Then, the storage provisioning module allocates the storage blocks to the requesting VM and changes the status of the storage blocks in block map 210 as allocated. The lock bits that were set at step 508 are then cleared and the process terminates thereafter.

Although one or more embodiments have been described herein in some detail for clarity of understanding, it should be recognized that certain changes and modifications may be made without departing from the spirit of the invention.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a computer system having virtual machines executed therein and a hypervisor supporting execution of the virtual machines, a method of issuing commands to release storage allocated to a logical block device by a storage device, comprising:
   upon deleting a file or receiving a command to delete a file, moving the file into a delete directory;
   cycling through one or more files in the delete directory and, for each file, issuing an unmap command to the storage device to release one or more blocks of the logical block device that are allocated thereto according to a file selection criterion;
   maintaining a block map that tracks which of blocks of the logical block device are free for allocation and are pending unmap;
   marking the blocks included in the unmap command as pending unmap in the block map; and
   upon receiving acknowledgement from the storage device that the blocks have been unmapped, marking the blocks as free in the block map.

2. The method of claim 1, wherein the file selection criterion includes one of a length of time the file has been placed in the delete directory, a file size, a file type, and file contents.

3. The method of claim 2, wherein the logical block device is a logical unit number (LUN) thinly provisioned in the storage device.

4. The method of claim 1, wherein said cycling comprises:
   determining that a file has been placed in the delete directory for longer than a threshold time;
   identifying blocks associated with the file; and
   issuing the unmap command to release one or more of the identified blocks that have not been reallocated by the hypervisor.

5. The method of claim 1, further comprising:
   provisioning additional blocks of the logical block device to the virtual machines,
   wherein at least one of the additional blocks is a block associated with a file that has been placed in the delete directory.

6. The method of claim 5, wherein said provisioning comprises:
   selecting blocks that are marked free in the block map.

7. The method of claim 1, wherein the file corresponds to a virtual disk.

8. A non-transitory computer readable storage medium comprising instructions executable by a virtualization software layer of a computer system having virtual machines executed therein, to carry out a method of issuing commands to release storage allocated to a logical block device by a storage device, the method comprising:
   upon deleting a file or receiving a command to delete a file, moving the file into a delete directory;
   cycling through one or more files in the delete directory and, for each file, issuing an unmap command to the storage device to release one or more blocks of the logical block device that are allocated thereto according to a file selection criterion;
   maintaining a block map that tracks which of blocks of the logical block device are free for allocation and are pending unmap;
   marking the blocks included in the unmap command as pending unmap in the block map; and
   upon receiving acknowledgement from the storage device that the blocks have been unmapped, marking the blocks as free in the block map.

9. The non-transitory computer readable storage medium of claim 8, wherein the file selection criterion includes one of a length of time the file has been placed in the delete directory, a file size, a file type, and file contents.

10. The non-transitory computer readable storage medium of claim 9, wherein said cycling is performed periodically and comprises:
    determining that a file has been placed in the delete directory for longer than a threshold time;
    identifying blocks associated with the file; and
    issuing the unmap command to release one or more of the identified blocks that have not been reallocated by the hypervisor.

11. The non-transitory computer readable storage medium of claim 8, wherein the method further comprises:
provisioning additional blocks of the logical block device to the virtual machines,
wherein at least one of the additional blocks is a block associated with a file that has been placed in the delete directory.

12. The non-transitory computer readable storage medium of claim 11, wherein said provisioning comprises:
selecting blocks that are marked free in the block map.

13. A computer system having virtual machines executed therein and a hypervisor supporting execution of the virtual machines, the computer system comprising:
a processor and memory,
wherein the hypervisor executes on the processor and is programmed to issue commands to release storage allocated to a logical block device by a storage device by performing the steps of:
upon deleting a file or receiving a command to delete a file, moving the file into a delete directory;
cycling through one or more files in the delete directory and, for each file, issuing an unmap command to the storage device to release one or more blocks of the logical block device that are allocated thereto according to a file selection criterion;
maintaining a block map that tracks which of blocks of the logical block device are free for allocation and are pending unmap;
marking the blocks included in the unmap command as pending unmap in the block map; and
upon receiving acknowledgement from the storage device that the blocks have been unmapped, marking the blocks as free in the block map.

14. The computer system of claim 13, wherein the logical block device is a logical unit number (LUN) thinly provisioned in the storage device.

15. The computer system of claim 14, wherein each of the virtual machines has a thinly provisioned virtual disk associated therewith and one of files in the delete directory corresponds to one of the thinly provisioned virtual disks.

16. The computer system of claim 13, wherein the file selection criterion includes one of a length of time the file has been placed in the delete directory, a file size, a file type, and file contents.

17. The computer system of claim 16, wherein said cycling is performed periodically and comprises:
determining that a file has been placed in the delete directory for longer than a threshold time;
identifying blocks associated with the file; and
issuing the unmap command to release one or more of the identified blocks that have not been reallocated by the hypervisor.

* * * * *